US008438960B2

(12) United States Patent
Booms

(10) Patent No.: US 8,438,960 B2
(45) Date of Patent: May 14, 2013

(54) APPARATUS FOR PERFORATING CORRUGATED TUBING

(75) Inventor: Richard Booms, Bad Axe, MI (US)

(73) Assignee: Valley Gear and Machine, Inc., Bad Axe, MI (US)

( * ) Notice: Subject to any disclaimer, the term of this patent is extended or adjusted under 35 U.S.C. 154(b) by 271 days.

(21) Appl. No.: 12/846,563

(22) Filed: Jul. 29, 2010

(65) Prior Publication Data

US 2011/0023676 A1 Feb. 3, 2011

Related U.S. Application Data

(60) Provisional application No. 61/229,510, filed on Jul. 29, 2009.

(51) Int. Cl.
*B23D 25/02* (2006.01)
*B23D 25/04* (2006.01)
*B26D 1/12* (2006.01)
*B26D 3/00* (2006.01)

(52) U.S. Cl.
USPC ...................... 83/322; 83/318; 83/672; 83/54

(58) Field of Classification Search .................... 83/322, 83/318–319, 54, 698.61, 672, 592, 303, 700, 83/340, 329; 409/203, 169, 131
See application file for complete search history.

(56) References Cited

U.S. PATENT DOCUMENTS

| | | | | | |
|---|---|---|---|---|---|
| 3,824,886 | A | | 7/1974 | Hegler | |
| 3,891,733 | A | * | 6/1975 | Maroschak | 264/40.7 |
| 3,899,265 | A | * | 8/1975 | Lang | 408/50 |
| 3,910,713 | A | * | 10/1975 | Maroschak | 408/1 R |
| 3,957,386 | A | * | 5/1976 | Lupke | 408/50 |
| 4,000,672 | A | * | 1/1977 | Sitterer et al. | 83/203 |
| 4,180,357 | A | | 12/1979 | Lupke et al. | |
| 4,218,164 | A | * | 8/1980 | Lupke et al. | 409/131 |
| 5,381,711 | A | * | 1/1995 | Truemner et al. | 83/318 |
| 5,385,073 | A | * | 1/1995 | Truemner et al. | 83/322 |
| 5,572,917 | A | * | 11/1996 | Truemner et al. | 83/322 |
| 5,957,020 | A | * | 9/1999 | Truemner et al. | 83/304 |
| 6,854,168 | B2 | * | 2/2005 | Booms et al. | 29/33 D |
| 7,013,778 | B1 | * | 3/2006 | Lupke et al. | 83/304 |
| 2005/0073069 | A1 | * | 4/2005 | Haraguchi et al. | 264/150 |

* cited by examiner

*Primary Examiner* — Ghassem Alie
*Assistant Examiner* — Bharat C Patel
(74) *Attorney, Agent, or Firm* — The Weintraub Group, P.L.C.

(57) ABSTRACT

An apparatus for cutting discontinuous apertures in the wall of a corrugated tube moving along an axial path between inlet and outlet ends of the apparatus, the apparatus including a first feeder-cutter wheel proximate to the outlet, a second feeder-cutter wheel proximate to the inlet and spaced axially from said first feeder-cutter wheel, each said wheel being disposed about the outer surface of said tube and having a cutting surface and a helical worm for engaging the tube corrugations, and means for rotating the feeder cutter wheels, wherein the improvement comprises means for axially moving the second feeder cutter wheel axially towards and away from the first feeder cutter wheel wherein to accurately position the feeder cutter wheels relative to tubing corrugations.

7 Claims, 9 Drawing Sheets

FIG 1
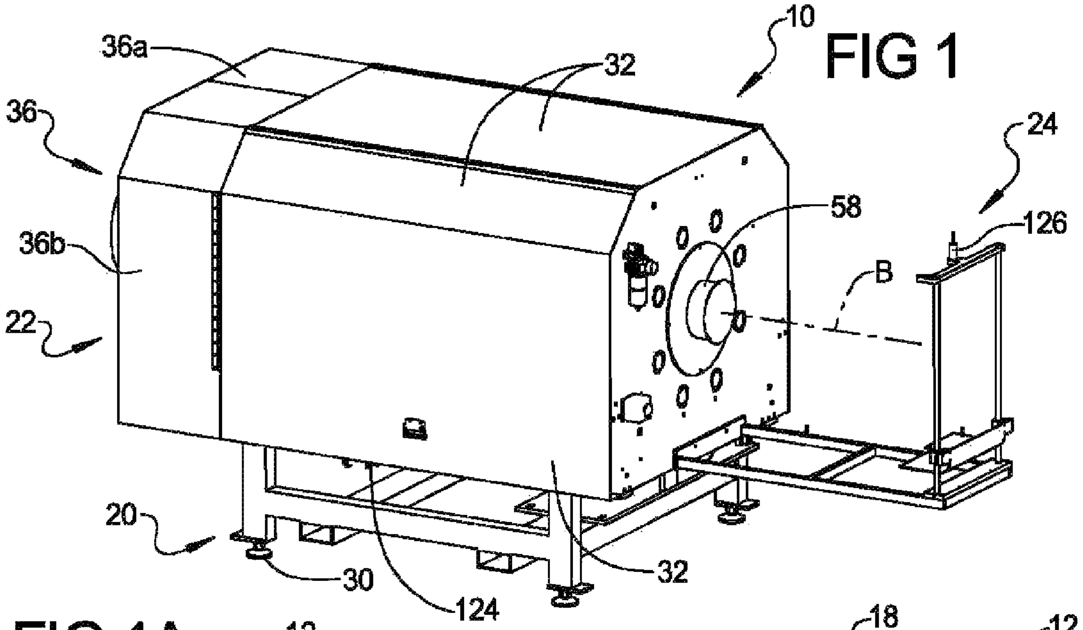
FIG 1A
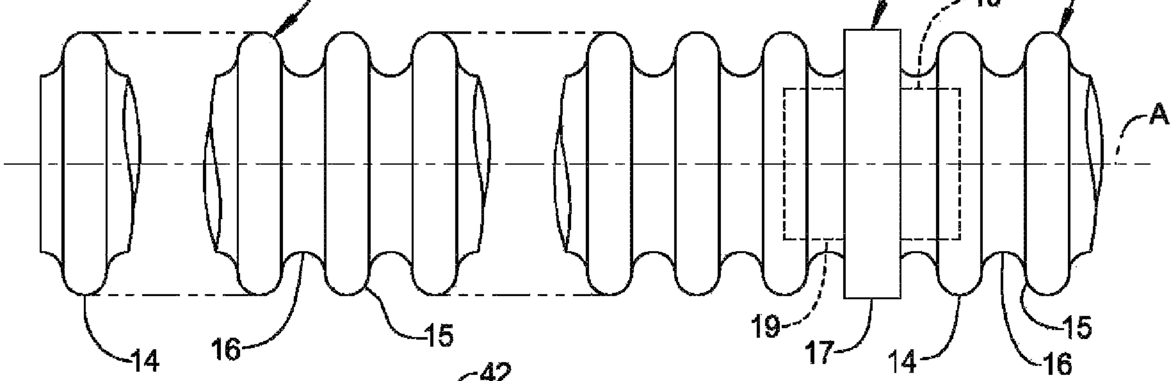
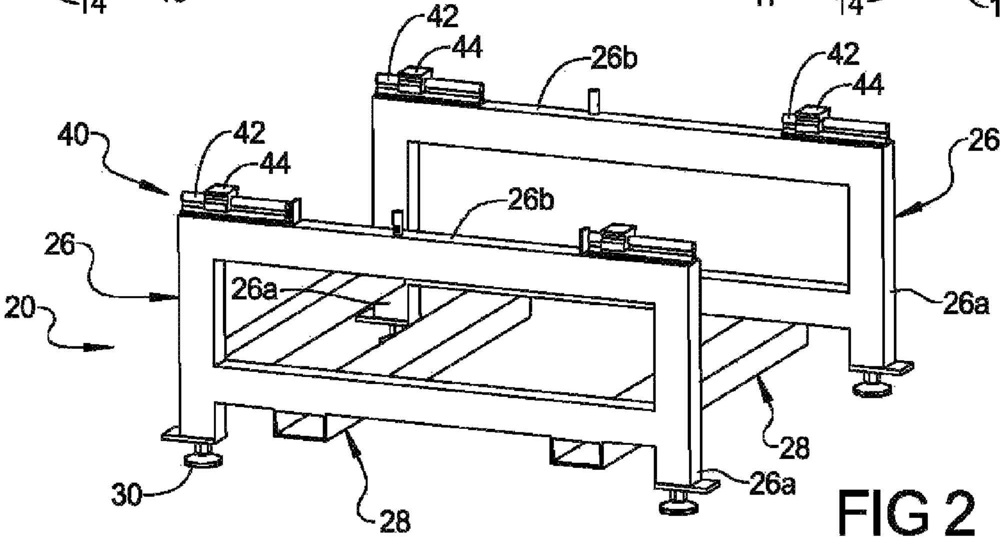
FIG 2

APPARATUS FOR PERFORATING CORRUGATED TUBING

CROSS-REFERENCE TO RELATED APPLICATION

This application claims the benefit of U.S. Provisional Application 61/229,510 which was filed on Jul. 29, 2009, the entire disclosure of which is hereby incorporated by reference.

BACKGROUND OF THE INVENTION

1. Field of the Invention

The present invention concerns an apparatus having first and second feeder-cutter assemblies and cutter wheels for perforating single and dual wall corrugated tubing defined by alternating annular crests and valleys. More particularly, the present invention concerns translatable structure for moving the cutter assemblies relative to one another and positioning their cutter wheels within respective valleys formed by successive corrugations and accurately cut perforations in tubing wall possibly having minor manufacturing imperfections, dimension problems, and deviations in perforation specifications.

2. Related Art

Machines for perforating tubing are disclosed in U.S. Pat. No. 3,824,886, issued Jul. 23, 1974 to Hegler; U.S. Pat. No. 4,180,357, issued Dec. 25, 1979 to Lupke et al.; U.S. Pat. No. 4,218,164, issued Aug. 19, 1980 to Lupke et al.; U.S. Pat. No. 5,381,711, issued Jan. 17, 1995 to Truemner et al.; U.S. Pat. No. 5,385,073, issued Jan. 31, 1995 to Truemner et al.; U.S. Pat. No. 5,957,020, issued Sep. 28, 1999 to Truemner et al.; and U.S. Pat. No. 6,854,168, issued Feb. 15, 2005 to Booms et al., the disclosures of each patent incorporated herein by reference.

Hegler (U.S. Pat. No. 3,824,886) teaches an apparatus for cutting apertures in corrugated tubing by rotating the cutter circumferentially around the tubing. The cutter is disposed within a ridge on a wheel driven by a transmission. The wheel and cutter cooperate with a roller to rotate about the tubing. The cutter travels in an epitrochoidal path around the outer surface of the tubing, causing a perforation where the cutter strikes the tubing. Hegler achieves perforations perpendicular to the axis of the tubing by this method.

While offering a relatively simple design to achieve its ends, Hegler is necessarily limited to perforating corrugated tubing at relatively low speeds due to the necessity of the wheel and cutter traveling the entire length of the corrugation. Increasing the traveling speed of the wheel beyond modest levels would result in miscuts in the tubing, such as cuts in the sidewalls of the corrugation instead of the valley thereof. Further, excessive wheel speed would cause the wheel to jump past corrugations, thus missing areas of the tubing and leaving these areas unperforated. In addition, Hegler does not address the issue of perforating dual wall piping.

Lupke et al. (U.S. Pat. No. 4,180,357) teaches an apparatus for perforating tubing, the apparatus having a plurality of lead screws for driving the tubing along an axial path, the lead screws meshingly engaging with the corrugations of the tubing. Each lead screw is mounted on an axis of rotation parallel to the axial path of the tubing. Mounted upon each lead screw is a cutter, flanked on each side by a raised rib. The cutter is in a plane substantially at a right angle to the axial path and the cutter intermittently intersects the tubing. Lupke '357 achieves rotation of the lead screws by a system of gear wheels coordinated such that pairs of lead screws cut the tubing simultaneously. Lupke reports that a maximum horizontal tubing speed of 20 feet per minute is achieved while cutting. However, at speeds greater than 20 feet per minute, the apparatus of Lupke experiences difficulty in realigning the cutter and properly perforating the tubing.

Lupke et al. (U.S. Pat. No. 4,218,164) improved upon the apparatus of the '357 patent in that the plurality of lead screw members have a helically raised rib member mounted centrally thereon to replace the raised straight ribs of the apparatus of the '357 patent. The cutter is disposed at the end of the helical rib. The helical rib tends to facilitate entry of the cutter into the valley of the corrugation. The rib extends around only a portion of the circumference of the shaft, thus continuing the teaching of intermittent intersection by the cutter as taught in the previous '357 patent. Lupke et al. reports that this apparatus achieves a horizontal tubing speed of approximately 40 to 50 feet per minute. However, at speeds in excess of 50 feet per minute, this apparatus tends to climb the sidewalls of the corrugation and perforate either those walls or the crown of the corrugation.

The devices of disclosed in the Lupke et al. '357 and '164 patents overcome the limitation of rotating the entire cutter wheel around the tubing as taught by Hegler. In the Lupke et al. '357 patent, the plurality of raised ribs essentially slowed the horizontal movement of the tubing long enough to effect the perforation. In the Lupke et al. '164 patent, the helical rib substituted for the plurality of straight ribs. This alleviated the need to slow or stop the horizontal travel of the tubing along the axial path to effect the perforation, and works relatively well at lower speeds, i.e. speeds less than 50 feet per minute.

However, both Lupke apparatuses encounter serious problems when greater speeds are attempted. When operated at speeds in excess of 50 feet per minute, the cutter of the first Lupke apparatus is not able to spring back to its original start position for the next intermittent engagement of the tubing. Thus, the cutter is not able to perforate the valley of the corrugation, but rather cuts into the sidewall, miscutting the tubing. Similar problems occur with the second Lupke apparatus.

Additionally, problems are encountered with the feed worms of Lupke. At high speeds, the vertical sides of the feed worms are unable to maintain their helical course in the corrugation. Thus, the worms tend to climb the side walls of the corrugations, crushing the crown of the tubing and skipping parts of the corrugation. These problems are amplified by attempts to cut non-flexible tubing, such as dual wall tubing.

Different problems are encountered when tubing is a dual wall construction. Dual wall tubing has corrugation on the outer surface thereof, while having a smooth, substantially hard inner cylindrical surface. Such tubing, having significantly greater rigidity, is more difficult to perforate.

Dual wall tubing, like other corrugated tubing, is often perforated immediately after being produced by an extrusion machine. The tubing comes at a non-constant rate due to the production process. This presents potentially serious problems, since reductions or increases in tubing production will affect the tubing perforation. In flexible corrugated tubing, this problem is addressed by increasing or decreasing the cutting of the perforator by a potentiometer. If the tubing is increased at too great a speed, the cutting is increased. If the tubing is produced at a lesser rate, the cutting is slowed.

This solution is not available when cutting perforations in dual wall tubing. The hard inner surface eliminates flexibility. Thus, tubing will not bend down or move up with the changes in production. Rather, the rate fluctuations will affect either a pulling or a pushing on the machine perforating the tubing. This is a significant problem in perforating this tubing.

An additional problem encountered in perforating tubing is the imperfect shape of most piping. When tubing is injection molded, the mold is set to produce tubing of a circular cross-section. However, due to imperfections in the mold, equipment deterioration and malfunction, or the like, the tubing produced often is not perfectly cylindrical. In circumstances where the tubing is stored on huge rollers after formation, for some period of time before perforation, sagging of the tubing tends to distort the cylindrical shape into an elliptical or oblong shape. When such misshaped tubing is fed into tubing perforating machines, such as those identified herein above, the tubing is miscut. Specifically, whole sections of tubing are skipped, while the sections that are cut are not properly cut, i.e. perforations occur in the crown of the corrugation and not in the valley of a corrugation. Since this is a circumstance that occurs with regularity, it is incumbent to have a device which can perforate piping of imperfect dimensions.

Another problem related to misshapen tubing is tubing shrinkage. When corrugated tubing is injection molded, plastic resins, often salvaged from scrap or waste plastic, such as soft drink bottles, are melted and recast into the desired tubing shape. However, as is known, different resins will shrink varying amounts when the extruded tubing cools. This can lead to tubing of diameters slightly less than that anticipated by the perforating machine. This difference will affect the perforation of the tubing, absent means for adjusting to changes in tubing flow.

An additional factor of importance in perforating tubing is the deployment of the perforations. It is often desired for certain usages to deploy the perforations in evenly separated rows around the tubing. For example, six rows of perforations would be deployed at an angular spacing of 60 degrees between each row. However, in certain environments, it may be desirable to control the displacement of the perforations. For example, some European communities prohibit piping having perforations in the bottom third of the tubing to prevent dirt from entering the tubing. Due to buying practices that have become common, other people desire tubing with a minimum number of perforations, i.e. six or eight rows. Therefore, for a truly versatile perforation machine, it must be capable of handling different perforation specifications.

The Truemner et al. Patents disclose improvements to the tube perforating (cutting) apparatuses disclosed by Lupke et al. and Hegler in the form of multiple feeder-cutter wheels, which concurrently perforate the tubing in the valley of its corrugations by virtue of cutters disposed within threading on the cutter wheels. The respective drive shafts for the feeder-cutter wheels are offset at an angle relative to the axial path of the tubing through the apparatus, this angulation facilitating uniform perforations at higher speeds.

Therefore, it is a purpose of the present invention to provide a perforating apparatus, which can adapt to slight variations in tubing size due to shrinkage of plastic resins or other dimensional variations such as resulting from manufacturing processes.

It is a further purpose of the present invention to provide an apparatus for perforating tubing, which can accommodate and perforate (cut) the material of corrugated tubing having a misformed cylindrical shape.

It is a still further goal of the present invention to cut tubing of higher rigidity, such as dual wall tubing.

It is a still further purpose of the present invention to provide a tubing perforator, wherein the user is not limited to an apparatus wherein the cutter wheels are preset to a presumed tubing configuration but can reposition the cutter wheels to a desired setting to effect cuts in rows of the tubing actually presented.

In practice, the end of a corrugated tube is introduced into the inlet end of the apparatus at a certain speed, which speed may change somewhat during the process. The feeder-cutter wheels are rotatably driven by a drive motor, with rotation of the feeder-cutter worms axially advancing the tubing. The feeder-cutter wheels can be controlled to rotate at a certain speed to advance the tube at a predetermined speed through the apparatus.

An object of this invention is provision of tube perforating apparatus having a speed control that is fully self-adjusting without user input. Desirably, differences between the speed of the introduced tubing and resulting from the rotation of the cutter wheels are fully adjusted by apparatus control system.

Additionally, in some applications, a separate coupling ring is used to join sections of corrugated tubing together, the combination or combining ring commonly being referred to as bell or a bell pipe. The bell has a diameter that is greater than the outer diameter of the tubing but has no corrugations. Thus in using a normal perforator, as the bell section passes through the apparatus, the feeder-cutter wheels would destroy the bell or be damaged by engagement with the bell.

An object of this invention is provision of a control system that selectively operates to prevent the feeder-cutter wheels and a bell pipe from engaging with one another as the corrugated tubing passes through the tube perforating apparatus.

Additionally, the perforating apparatus typically includes structure for guiding or otherwise supporting the corrugated tubing as it passes through between the inlet and outlet ends of the apparatus. Although the tubing typically has a generally constant diameter, the bell pipe has annular sections which have a diameter greater than that of the tubing. This enlarged diameter about the bell pipe could snag against structure and impede axially advance of the tubing through the apparatus.

An object of this invention is provision of guide structure that engages the outer periphery of corrugated tubing to support and center the tubing with the axial path through the apparatus and also adjusts when needed by expanding/contracting to accommodate changes in diameter of the corrugated tubing, such as presented by a bell pipe.

It is to these ends that the present invention is directed.

SUMMARY OF THE INVENTION

The present invention is directed to an improvement in an apparatus for cutting discontinuous apertures in the wall of a corrugated tube moving along an axial path between inlet and outlet ends of the apparatus, the apparatus including a first feeder cutter wheel proximate to the outlet, a second feeder cutter wheel proximate to the inlet and spaced axially from said first feeder cutter wheel, each said wheel being disposed about the outer surface of said tube and having a cutting surface and a helical worm for engaging the tube corrugations, and means for rotating the feeder cutter wheels, wherein the improvement comprises means for axially moving the second feeder cutter wheel axially towards and away from the first feeder cutter wheel wherein to accurately position the feeder cutter wheels relative to tubing corrugations.

The improvement further comprises:

a generally planar first and second plate, each said plate having a circular opening for passing the tube, first means for mounting the first feeder cutter wheel on said first plate, said means for mounting including first means for moving the first feeder cutter wheel radially inwardly and outwardly of the opening thereof and towards the outer surface of said tube, and second means for mounting the second feeder cutter wheel on the second plate, said second means for mounting including second means for moving the first feeder cutter wheel radially inwardly and outwardly of the opening thereof and towards the outer surface of said tube.

According to this improvement:

said apparatus comprises a housing having an interior chamber formed, in part, by a plurality of beams and panels mounted on said beams, and said means for axially moving comprises a plurality of separate positioning blocks, each said block movably mounted on a respective beam and fixedly connected to the second plate, and means for securing the block against movement relative to the beam.

Further and according to this improvement, said apparatus comprises a support frame, said support frame having forward and rearward ends and including means for defining a mountable support, and means for mounting the housing to said support for axial sliding movement relative to forward and rearward ends of the support frame.

Further and according to this improvement, there is provided means for adjusting the support frame in a manner that the support is substantially horizontally disposed.

In one preferred application, the tubing is comprised of two or more corrugated sections defined by an alternating succession of peaks and valleys with respective ends two adjacent sections joined by a coupling having an outer diameter greater than the outer diameter of the corrugated sections, and the apparatus further comprises first means for centering the tubing relative to the axial path and the center of the openings in said plates.

Preferably, the first means for centering comprises an array of tube centering guides, respectively, disposed around each said opening, each said guide including a parallelogram linkage including an elongated engagement beam adapted to engage a length of tubing passed through the apparatus, a support beam fixedly mounted to a plate of the apparatus in a manner to extend parallel to the axial path of the tubing, a swing arm pivotally connecting the beams to one another in a manner to allow the engagement beam to swing upwardly and from a first position to a second position, and a spring for normally biasing the engagement beam into the first position.

Preferably, each array comprises four spring guides disposed generally equiangularly about the opening.

According to this invention, there is also provided second means for centering the tubing relative to the axial path and the center of the openings in said plates, said second means comprising an array of right-angled centering rods disposed equiangularly about each said opening, said centering rods having a proximal end fixedly connected to a respective plate and a distal end spaced form the opening and disposed on an imaginary circle representative of the outer periphery of the tube to be centered with the axial path as the tube is passed through the apparatus.

According to this invention, said means for rotating comprises a drive motor, and a plurality of drive shafts connecting the drive motor to respective of the feeder cutter wheels, and said apparatus further comprises means for controlling the rotation of said feeder cutter wheels.

According to this invention, the means for mounting the housing to the support for axial sliding movement relative to forward and rearward ends of the support frame comprises a plurality of first rail segments and second rail segments, respectively, fixedly connected to the housing and said support frame and slidably interengaged with one another.

According to this invention, the improvement further comprises means for controlling movement of the housing relative to the support frame and the rotation of the feeder cutter wheels, the means for controlling movement comprising a sensor and target mounted to one and the other, respectively, of said support frame and said housing, said sensor sensing when the housing movement relative to the frame exceeds a predetermined value and transmitting a signal to the drive motor to speed up or slow down the rotation of the feeder cutter wheels.

According to this improvement, the housing outlet is formed, at least in part, by an openable door, the door being formed in two portions, the minor image of one another, and each portion having a hinge connection to the housing and a semi-cylindrical portion, the semi-cylindrical portions combining to form a guide tube for supporting the perforated tubing exiting the housing.

Further and according to this invention, the means for rotating the feeder cutter wheels comprises a drive motor, and a first and second drive shaft, respectively, drivingly connecting the motor to a respective of the first and second feeder cutter wheel, said first drive shaft having a forward end portion and a U-joint formed of forward and rearward parts, respectively, connected to the feeder cutter wheel and the forward end portion of the drive shaft, the rearward part forming a socket having an inner circumference sized to matingly receive the outer circumference of the forward end portion and wherein each circumference has a complementary series of angularly separated and axially elongated keys and keyways that interfit with one another to provide a longitudinally movable joint without any relative angular motion therebetween.

In another embodiment of the present invention, there is provided an improved apparatus for providing discontinuous perforation in the wall of corrugated tubing as the tubing is passed along an axial path thereof, the improved apparatus comprising:

a first and second cutter station, each station including at least one pair of feeder-cutter wheels, each wheel comprising a worm, a threading disposed upon the worm, and a plurality of cutters disposed within the threading, each wheel being adapted to continuously intersect the corrugation of the tubing; and at least one pair of drive shafts, and means for drivingly connecting the each drive shaft to a respective feeder-cutter wheel thereof, the drive shafts being deployed at an angle relative to the axial path of the tubing to apply pressure to the tubing as it is moved past the wheels;

means for rotating the drive shafts; and means for mounting the first cutter station and cutter wheels thereof to the apparatus and for translatable movement along a path parallel to the axis of the tubing and toward and away from the second cutter station and cutter wheels thereof.

According to this embodiment, the means for mounting the first cutter station comprises a generally planar plate member disposed perpendicularly to the path, a plurality of positioning blocks disposed about the plate, the blocks connected to the plate and fixedly movable between first and second positions.

Also according to this embodiment, the means for drivingly connecting each drive shaft of the first cutter station to a respective feeder-cutter wheel thereof comprises each feeder cutter wheel being connected by a U-joint including a socket sized to receive the forward end portion of the drive shaft, the socket and forward end portions having mating surfaces provided with interengaging keys and keyways that permit relative axial movement therebetween but prevent relative rotation therebetween.

Further and according to this invention, there is provided means for centering and guiding the tubing relative to the axial path, the means for centering including, at least in part, the first cutter station including an array of spring tensioned support beams, each support beam being biased towards the path and adapted to be engaged by the advancing tube and swing upwardly while maintaining engagement. The guides are in parallel relation with the axial path and engage a length of the tubing. Preferably, several spring-tensioned guides are arranged generally equiangularly about the path.

As a complement to the guiding and centering the tubing, a cylindrical guide tube is provided at the inlet and outlet to the apparatus. Additionally, the first and second cutter stations each include a respective array of tube centering rods which encircle the outer periphery of the tubing to prevent off-axis wobbling of the tubing.

The present invention will be more clearly understood with reference to the accompanying drawings, in which like reference numerals refer to like parts, in which:

BRIEF DESCRIPTION OF THE DRAWINGS

FIG. 1 is a perspective view of an apparatus according to this invention for perforating corrugated tubing, the apparatus as viewed from an inlet end thereof and including a cutter head slidably positionable atop a support frame, the cutter head being adapted to perforate and pass tubing between inlet and outlet ends thereof;

FIG. 1A is a side view showing conventional corrugated tubing adapted to be perforated by the apparatus of FIG. 1, showing an arrangement wherein two lengths of like configured tubing are joined together by a bell pipe;

FIG. 2 is a perspective view of the support frame;

DETAILED DESCRIPTION OF THE PREFERRED EMBODIMENT

Figure 3:
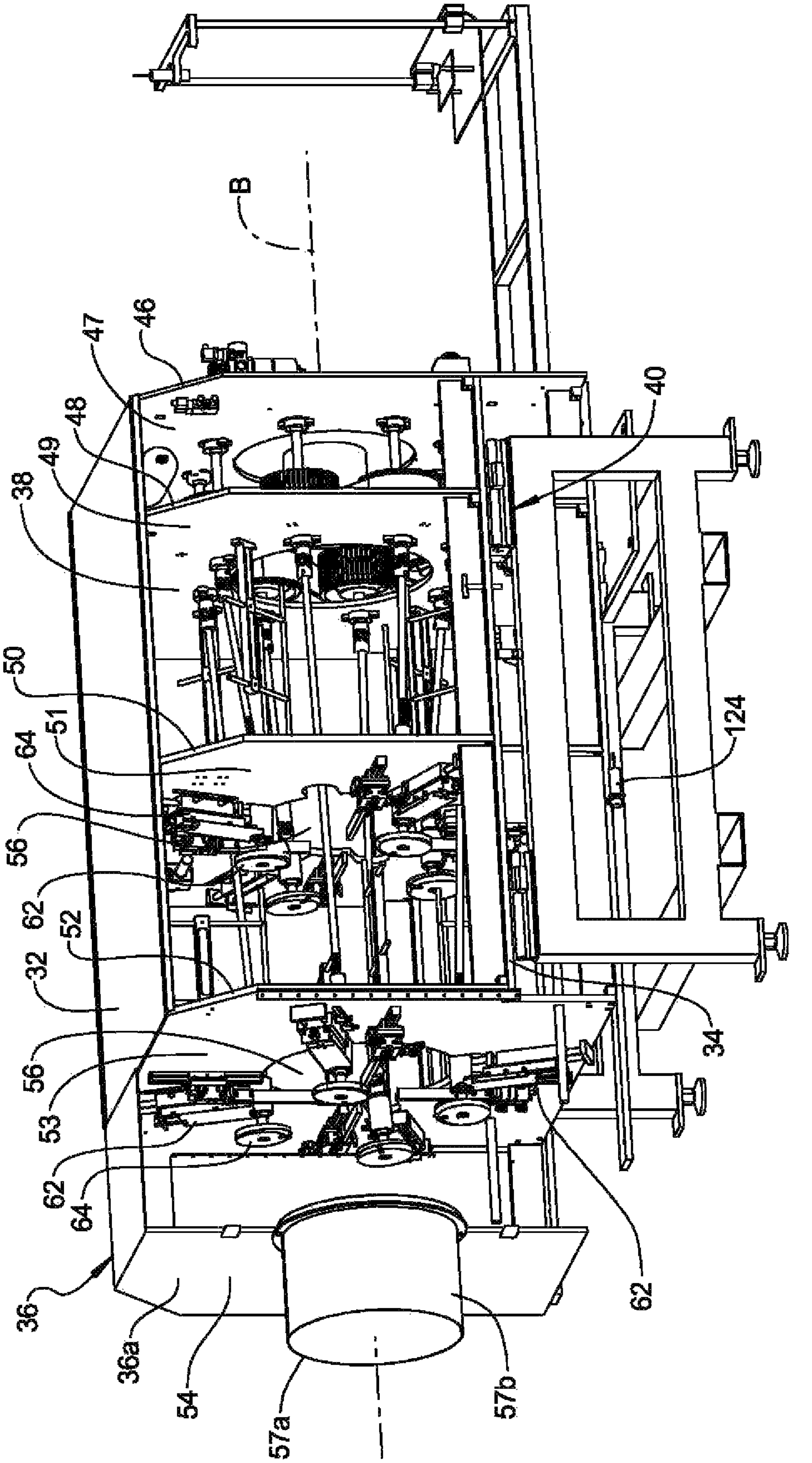
FIG. 3 is a perspective view of the apparatus of FIG. 1, as viewed from the outlet end, with front and side panels of the cutter head removed to illustrate the interior of the cutter head and relatively axially movable fixed and movable plates mounting tube cutter wheels and pneumatic pistons thereon, a drive mechanism including drive shafts for driving the cutter wheels, and spring tensioned guides for centering and guiding the corrugated tubing along an axial path as the tubing moves between the inlet and outlet ends of the apparatus.
Figure 4:
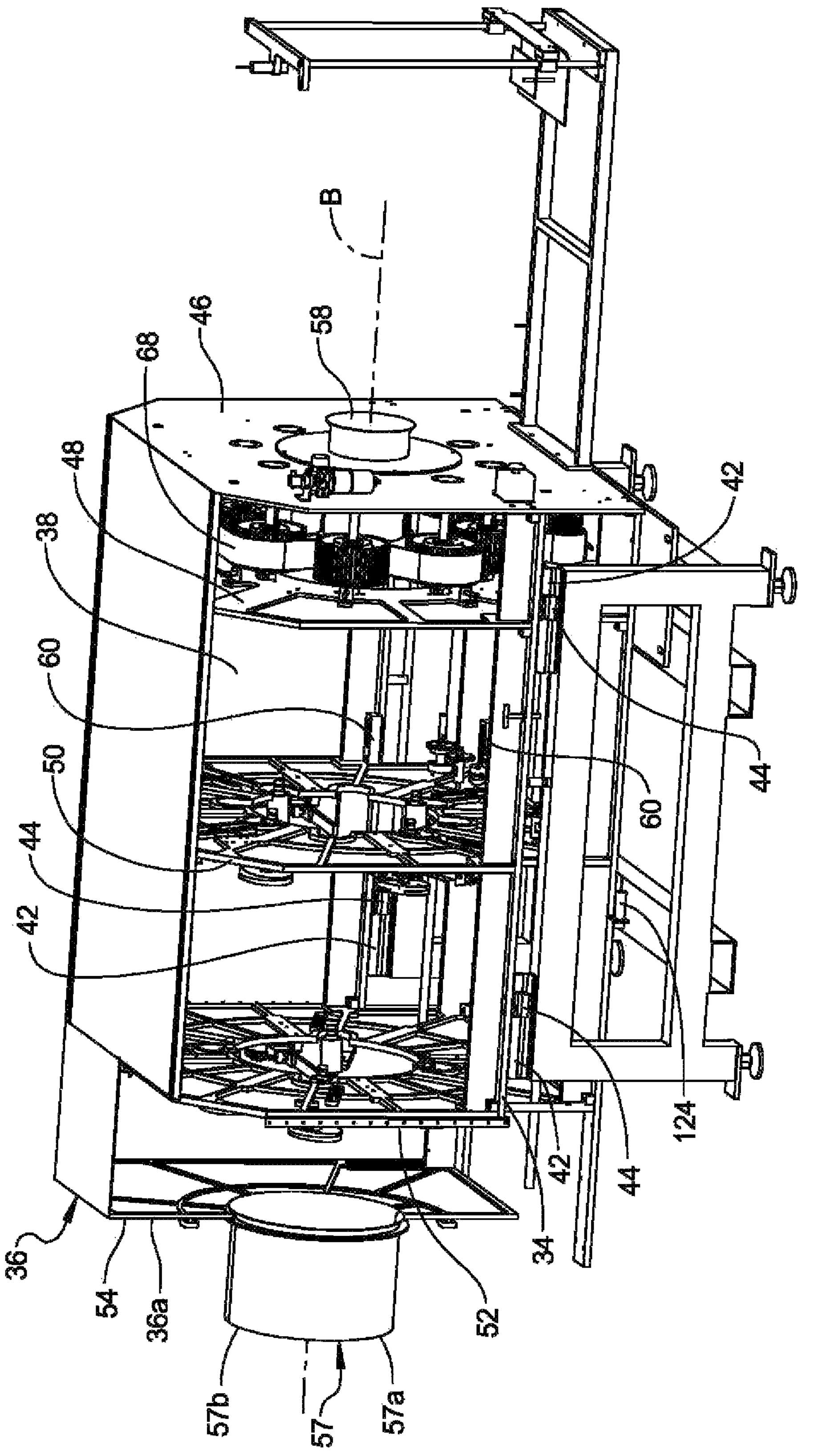
FIG. 4 is an enlarged perspective view of the interior of the cutting head illustrating positioning blocks for axially positioning the movable plate relative to the fixed plate and radially positioning the cutter wheels thereof for perforating engagement with a tubing corrugation, details of the other tube cutting elements being removed for clarity.

With reference now to FIGS. 1-11, there is shown an apparatus for perforating corrugated tubing, the apparatus indicated generally by the reference number 10 and the tubing indicated by the number 12.

As illustrated in FIG. 1A, the corrugated tubing 12 is generally cylindrical and defined by an alternating, or undulating, succession of annular crests 14 and troughs or valleys 16 and angled flanks 15 disposed along the geometric center axis “A” of the tubing. Depending on the application, the tubing 12 may be single or double walled, relatively thin-walled, and come in predetermined lengths or sections. In the embodiment illustrated, the tubing 12 is single walled and formed into 10-foot lengths.

In some applications, a user may desire that the perforating operation be substantially continuous and uninterrupted. That is, successively feeding separate 10-foot lengths of tubing is labor intensive. As such, in some applications, two or more lengths of corrugated tubing 12 are joined to one another at their respective ends by a coupling 18, which is commonly referred to as a bell. The bell 18 is generally cylindrical and has an enlarged central portion 17 and opposite end portions 19, 19', the end portions 19, 19' fitting within the ends of two respective lengths or sections of tubing 12. The central portion 17 typically has an outer diameter that is greater than the outer diameter of the tubing 12, as defined by the crests 14.

As will be described herein below, the apparatus 10 is adapted to handle both single and double wall tubing, tubing lengths joined by a bell, and tubing sections having misformed undulations, such as where the tubing is out of round and/or the troughs, crests and flanks of the tubing as supplied may not meet specifications.

Referring to FIG. 1, the apparatus 10 comprises a mounting frame 20, a cutter head 22 for perforating a length of corrugated tubing (not shown), and, in part, a control system 24 for controlling the operation of the apparatus. As will be described herein below, the cutter head 22 operably houses feeder-cutter assemblies 62 and feeder-cutter wheels 64 for cutting (perforating) the tubing, and a drive mechanism 68 housed within the apparatus 10 for driving the feeder cutter wheels 64 to advance the tubing and perforate the wall by cutting discontinuous apertures, or holes, in the wall of the tubing 12.

Referring to FIG. 2, the mounting frame 20 includes a pair of lateral support frames 26 and cross-braces 28 that extend transversely between and fixedly connect the support frames together. Each support frame 26 includes a pair of support legs 26*a* for supporting the mounting frame on the ground and a support beam 26*b* that extends between the support legs 26*a*. In the embodiment illustrated, the support legs 26*a* are at the opposite ends of the support beams 26*b* and are disposed vertically, and the support beams 26*b* are disposed horizontally whereby to provide a horizontal mounting plane. To ensure that the support beams 26*b* are disposed horizontally, each of the legs 26*a* of the support frames 26 can include an extender 30, which may be extended or retracted relative to the leg.

Referring to FIGS. 1, 3, 4 and 6, the cutter head 22 is formed by a combination of panels 32, beams 34, and doors 36 that combine to form a rectangular shaped housing having an accessible interior 38. The cutter head 22 is mounted atop the mounting frame 20 by a rail system 40 in a manner to provide axial slidable (i.e., floating) movement of the cutter head 22 relative to the mounting frame 20.

Shown best in FIGS. 2 and 3, the rail system 40 includes first and second sets of interengaging rails 42 and 44, including a pair of first rails 42 that extend upwardly from opposite ends of each support beam 26*b* and two pairs of second rails 44 that extend downwardly from respective pairs of support beams 34 that extend along and between opposite ends of the cutter head 22. Interengagement between the rails 40 and 42 operates to support and enable the cutter head 22 to axially slide (or slip) back and forth atop the mounting frame 20.

The cutter head 22 includes a series of five vertical plates 46, 48, 50, 52, and 54, each having a central opening 56 sized to pass the corrugated tubing 12, and the plates subdividing the interior chamber 38 of the cutter head into a respective series of compartments 47, 49, 51, and 53. The openings 56 are generally circular and their respective centers are aligned with one another to form an axial path "B" generally centered with the geometric center axis "A" of the corrugated tubing.

The first vertical plate 46 is fixedly attached to the cutter head 22 and defines, at least in part, the inlet end of the cutter head. The plate 46 includes a hollow cylindrical inlet guide tube 58, which is fixedly mounted in coaxially centered relation with the opening 56 thereof and is dimensioned to receive, support, align, and guide the forward end of tubing 12 to be perforated into the first compartment 47 of the interior chamber 38.

The second vertical plate 48 is fixedly attached to the cutter head 22 and forms with the plates 46 and 50 the interior compartments 47 and 49.

Significantly, and according to an important aspect of this invention, the third vertical plate 50 is movably mounted to the cutter head 22 for axial re-positioning movement in the chamber 38 and movement towards and away from the vertical plate 52. In this regard, and referring to FIGS. 4 and 6, a series of positioning blocks 60 are disposed around the outer periphery of the movable plate 50. The positioning blocks 60 are connected at their forward ends to the plate 50 and by their bottom surfaces to respective of the longitudinally extending beams 34 of the cutter head.

In the embodiment illustrated, the positioning block 60 is generally rectangular in shape and has opposite ends, a generally flat base seated atop the beam 34, and a central axial slot extending axially between the opposite ands thereof. One end of the positioning block 60 is fixedly attached to the movable plate 50. At least one threaded fastener (not shown) is passed through the axial slot and secured to the beam 34 of the cutter head. Tightening and untightenting movement of the fastener enables the positioning block 60 to move (i.e., slide) axially between first and second positions, and thereby move the plate 50 as well. This axial adjustment is done with all of the positioning blocks wherein to move the plate 50 in parallel fashion between the fixed plates 48 and 52.

In other applications, the positioning blocks may be in the form of hydraulic or pneumatic cylinders. In a manner similar to that described regarding the positioning blocks 60, the fluid controlled cylinders are fixedly mounted to a respective of the beams 34 and the forward end of the axially extensible/retractable cylinder piston is fixedly connected to the outer periphery of the plate 50. Actuation of the fluid controlled cylinders operates to move the plate 50 closer to or away from the plate 48. Desirably, the hydraulic cylinders could all be electronically controlled and actuated simultaneously by a signal from the control system 24. The cylinders are not shown as understood by those skilled in the art.

Further, to constrain the movement of the plate 50, and ensure that the plate moves parallel to the other plates and perpendicular to the axis "B," the outer periphery of the plate 50 may include inward notches or slots that register with respective of the beams 34 that extend between the opposite ends of the cutter head, and to which the positioning blocks 60 are mounted. The interengagement between the notches and beams ensure vertical movement of the plate 50.

The fourth plate 52 is fixedly attached to the cutter head 22 and in part forms the compartments 51 and 53.

The fifth or last vertical plate 54, at least in part, forms the outlet end of the cutter head 22 for discharging the perforated tubing 12, and is in the form of an openable door 36. The door 36 includes two door portions 36*a* and 36*b*, which are minor images of one another, hingedly mounted to the cutter head 22, and move between a closed position and an open position. Each door portion 36*a* and 36*b*, respectively, includes a semi-cylindrical portion 57*a* and 57*b*. In the closed position, the door portions 36*a* and 36*b* form a closure about the plate 52 and the semi-cylindrical portions 57*a* and 57*b* combine to form a hollow cylindrical outlet guide tube 57, coaxially aligned with the tube axis "A" and defines, at least in part, an outlet for discharging the perforated tubing 12. In the open position, the door portions 36*a* and 36*b* open to provide access to the fourth plate 52 and tube passing opening 56 thereof.

Various components, which substantially simultaneously engage, perforate, and advance the corrugated tubing along an axial path, are generally centered with the geometric axis of the tubing, and between the opposite ends of the housing.

In use, a length of corrugated tubing 12 is fed into the chamber, the perforating components 62 and 64 are centered with at least two axially spaced valleys 14 of the tubing 12, whereupon the tubing 12 is axially fed into and through the cutter head 22 at a predetermined speed and the perforating operation begun.

As will be described, the control system 24 monitors the position of the cutter head 22 relative to the frame 20, adjusts the speed by which the corrugated tubing is fed into and through the cutter head, and adjusts the driving rotation of the perforator components, which driving rotation and moves the tubing relative to the cutter housing.

Figure 5:
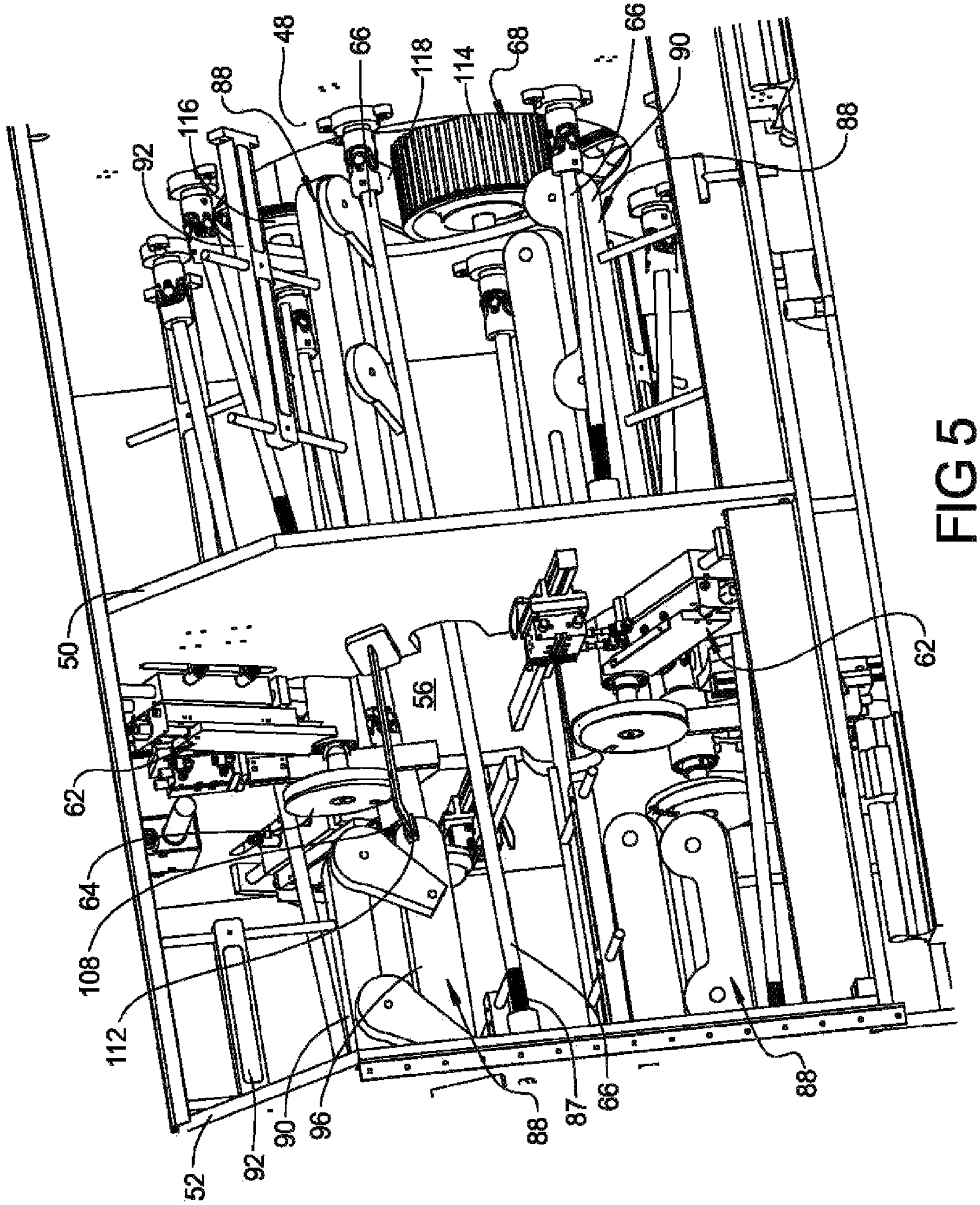
FIG. 5 is a perspective view of the interior of the cutter head illustrating the drive mechanism and drive shafts, various of the cutter wheels and pistons for moving the wheels radially, and the spring tensioned guides.
Figure 6:
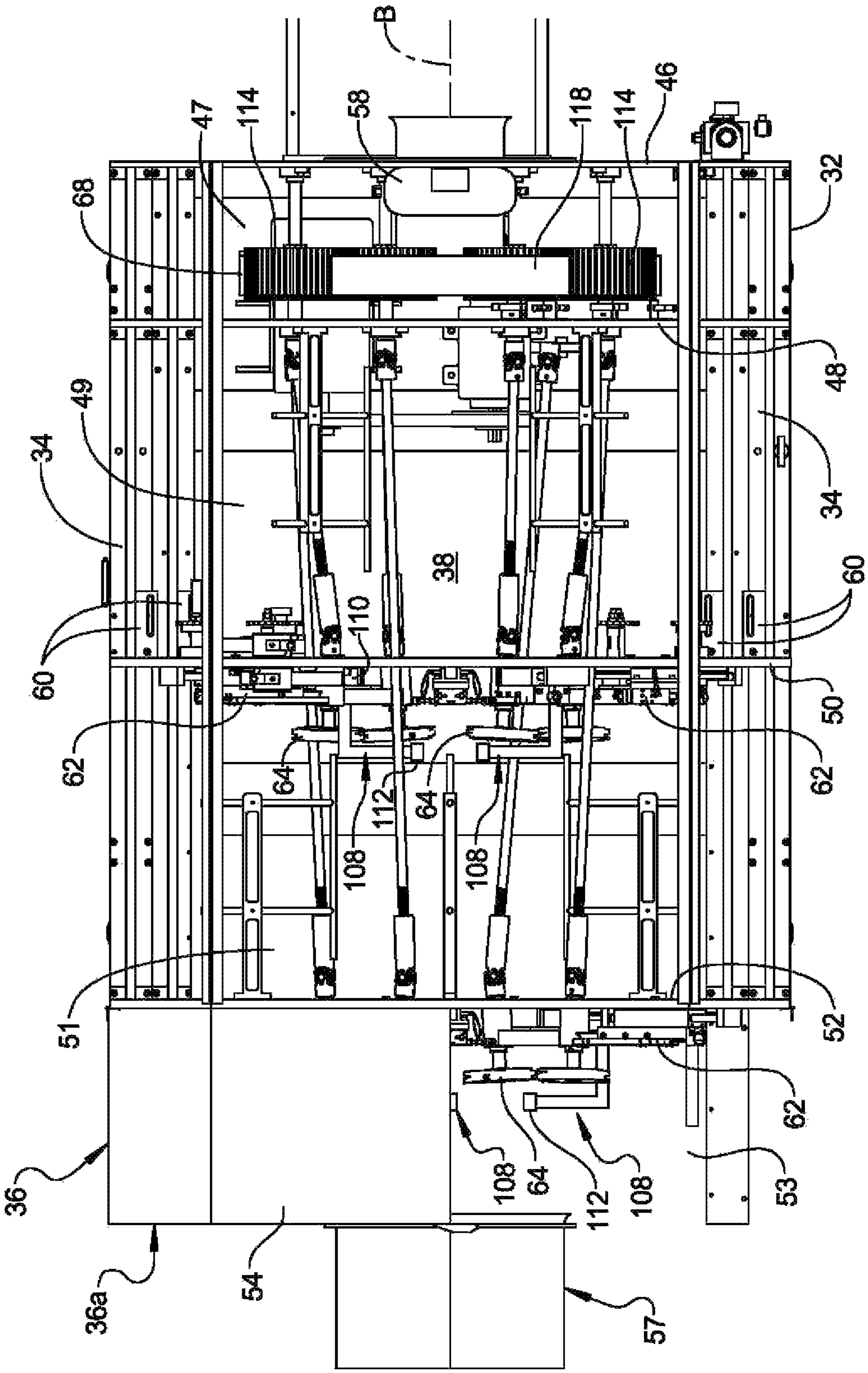
FIG. 6 is a plan view looking down at the cutter head, with panels removed, to show, in part, the drive mechanism at the inlet end, the fixed and movable plates in relation to the inlet and outlet ends, and the cutter wheels disposed in various planes and angles relative to their respective plates, the drive shafts and tensioned guides removed for clarity.
Figure 8:
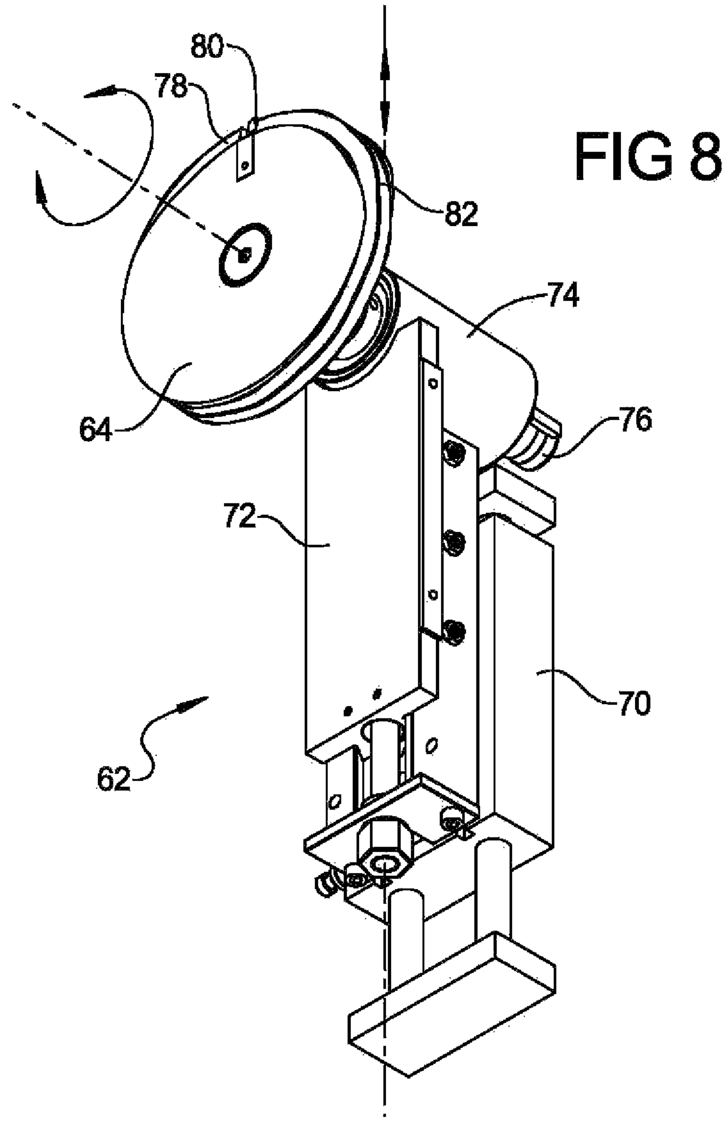
FIG. 8 is a perspective view showing detail of a cutter wheel assembly including a cutter wheel and air cylinder for moving the wheel radially when mounted to a plate.

Referring to FIGS. 5 and 8, the cutter head 22 comprises a plurality of feeder-cutter wheel assemblies 62, each including a feeder-cutter wheel 64, a plurality of drive shafts 66, and a drive mechanism 68 for rotating the drive shafts 66. A first set of feeder cutter assemblies 62 is fixedly mounted on the movable plate 50 and a second set of feeder-cutter assemblies 62 is fixedly mounted on the fixed plate 52, each set positioning the respective feeder-cutter wheel 64 thereof relative to the tube passing opening 56 of the respective plate.

Referring to FIG. 8, the feeder-cutter assembly 62 comprises means for radially adjusting the feeder-cutter wheel 64 with respect to the axial path "B" to accommodate for variations or inconsistencies in the diameter of the tube 12. For example, the means for radially adjusting can comprise a hydraulic or pneumatic cylinder 70 fixedly mounted atop the plate, a carriage 72 connected to the cylinder 70 for movement thereby, and a cutter wheel housing 74 connected to the carriage 72 for movement therewith. The housing 74 has a drive shaft 76 journalled for rotation therein, with opposite ends of the drive shaft 76, respectively, drivingly connected to the feeder-cutter wheel 64 and to a respective drive shaft 66. The carriage 72 moves radially relative to the axial path "B" and positions the feeder-cutter wheel 64 relative to the opening 56 of the plate to which the cutter assembly 62 is mounted, and also relative to a respective corrugation of the tube 12. The axis of the drive shaft 74 is in generally parallel radially spaced relation to the axial path "B" and perpendicular to the plate to which the cutter assembly 62 is mounted.

As described in the patents referenced above, such as U.S. Pat. No. 5,381,711, the feeder-cutter wheel 64 comprises a worm 78, a cutter blade 80, and a threading 82 disposed helically on the outer surface of the worm. The worm 78 comprises a solid cylindrical body, the diameter of which is determined by the size of the tubing to be perforated. When mounted, the worm 78 is generally parallel to the plate to which mounted. The threading 82 facilitates the intersection and intermeshing of the feeder-cutter wheel 64 and the cutter blade 80 with the corrugated tubing. The cutter blades 80 are disposed within the helical threading. During rotation of the drive shaft 66, the drive shaft 76 is rotated and the threading and the cutter blade of the feeder cutter wheel rotate and cooperate to concurrently drive the tubing through the apparatus 10 and perforate the tubing 12. As described in U.S. Pat. No. 5,381,711, the feeder cutter wheels 64 are deployed in two or more pairs.

Actuation of the cylinder 70 adjusts the position of the carriage 72 and associated feeder cutter wheel 64 in a manner that the cutter wheel is accurately positioned within a valley 16 of the tube 12 to be cut (perforated). Importantly, unless retracted, the feeder cutter wheels 64 would destroy a bell 18 used to join sections of tubing. The cylinders 70 allow the feeder cutter wheels 64 to be retracted from the tubing 12 just prior to the bell 18 entering the openings 56 of the plates 50 and 52.

Figure 11:
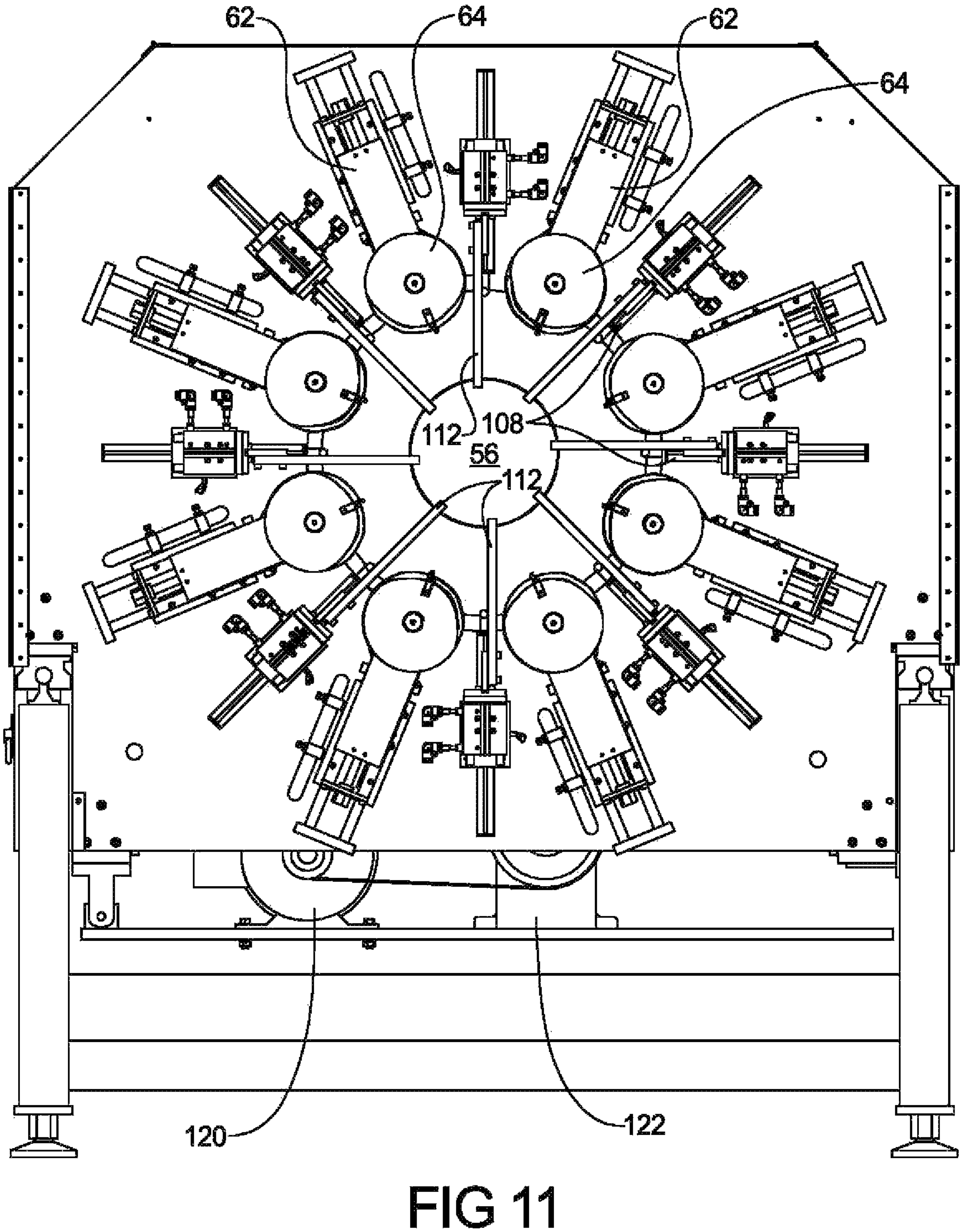
FIG. 11 is an end view of the cutter head with the outlet end doors removed to show detail of the cutter wheels and tube passing area.

Referring to FIGS. 3 and 11, the movable and fixed plates 50 and 52, respectively, define first and second cutter stations, or stages, and each is provided with two pairs of feeder cutter assemblies 62 and respective feeder-cutter wheels 64, or four pairs total. In this four pair arrangement, two pairs of cutter wheels 64 will strike the tubing 12 in a first plane while the remaining two pairs of cutter wheels 64 will all strike the tubing in a second plane.

A respective drive shaft 66 is drivingly connected to the feeder-cutter wheel 64 via the drive shaft 76.

Figure 10:
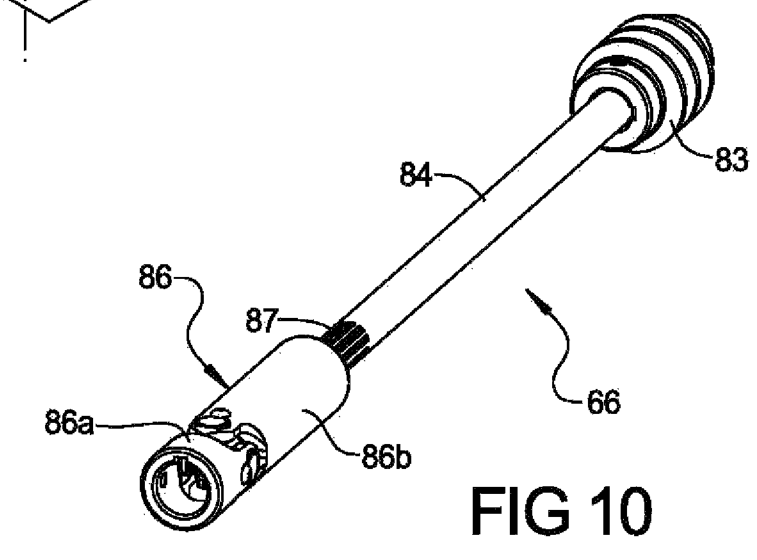
FIG. 10 is a perspective view of a drive shaft and a splined driven end portion thereof.

Referring to FIG. 10, in a preferred embodiment, the drive shafts 66 comprise a rearward end portion 83, a forward end portion 84, and a U-joint 86 having forward and rearward joints 86*a* and 86*b* that drivingly interconnect the drive shaft 76 with the drive shaft 66 and transmit torque and rotation to the feeder-cutter wheel 64. The rearward end portion 83 is connected to the drive mechanism 68, as described herein further below.

Preferably, and according to this invention, at least as regards the drive shafts 66 associated with the movable plate 50, the rearward joint 86*b* forms a socket having an inner circumference sized to matingly receive the outer circumference of the forward end portion 84, wherein each circumference has a complementary series of angularly separated and axially elongated splines or keyways 87 that interfit with one another to provide a longitudinally movable joint without any circumferential (i.e., relative angular) motion therebetween. As will be described in detail, such spline joint enables the drive shaft 66, proximate to the movable plate 50, to extend, and increase in length, or retract, and decrease in length, and the U-joint to enable a knee to form, and the plate 50 to translate.

The drive shafts 66, drivingly connected to the feeder cutter wheels of the fixed plate 50, preferably include, but in some applications may not include a splined joint.

Plastic corrugated tubing, as it is commonly and uniformly manufactured today, has the characteristic of being thickest at the valley of the corrugation and on the crowns of the corrugation. Thus, the sidewalls of the tubing are comparatively weak due to the manufacturing techniques utilized. This is particularly true of thicker tubing, which has a substantially increased thickness at the valley of the corrugation. Following the principle of seeking the path of least resistance, the known apparatuses for perforating tubing will often, and especially at speeds exceeding 50 feet per minute, miscut the tubing because the cutter cannot slit the thick plastic at the bottom of the corrugation. Thus, the tubing is cut on the sidewalls, or less commonly, on the crown.

This problem is accentuated in tubing of larger diameters and corrugations of larger pitch.

According to this invention, the tubing 12 is positioned relative to the cutter head 22 and within the opening 56 of the fixed plate 52. The feeder cutter wheels 64 thereof are positioned within a respective valley 16 of the tubing 12. The splined joint and U-joint connection at the forward end of the drive shafts 66, connected to the feeder cutter assemblies 62 of the movable plate 50, enable the plate 50 to be axially moved into position relative to the fixed plate and the opening 56 thereof and the feeder cutter wheels 64 to be positioned relative to a different valley 14 of the tubing. The splined joint and U-joint connection allows the plate 50 to move and the drive shaft to shorten, or extend. As such, when the two spaced sets of feeder cutter assemblies 62 and associated feeder cutter wheels 64 are in position relative to the two respective valleys, the positioning blocks are fixedly secured to the beams 34 and the movable plate 50 fixed relative to the fixed plate 52.

Coaxial centering of the tubing with the axial path "B" is important to ensure that the sets of feeder cutter wheels 64 are accurately positioned within the corrugations. However, the bell 18 used in certain tubing is greater in diameter than the rest of the tubing resulting in wobble during passage of the tube through the cutting head.

Figure 7:
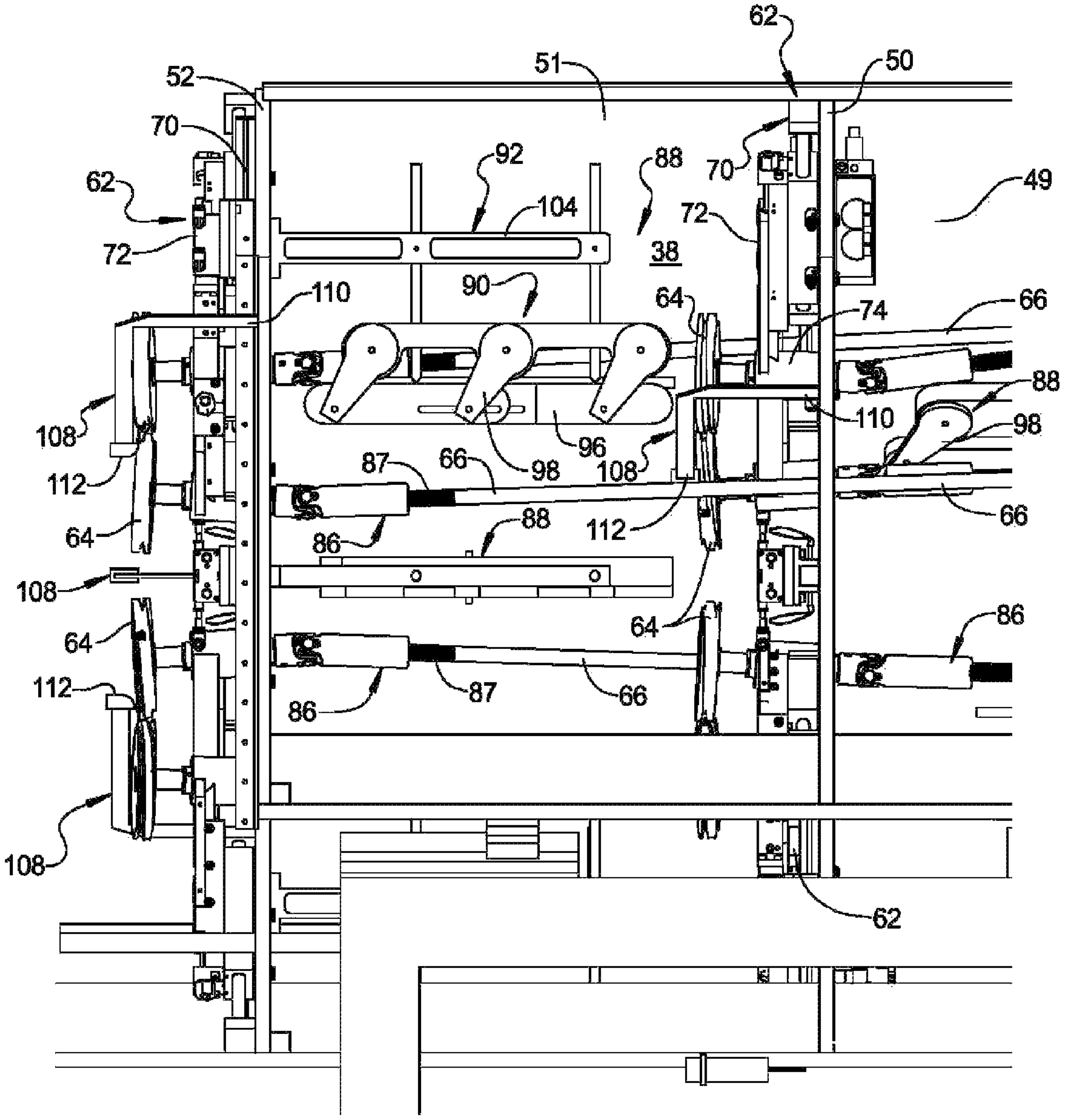
FIG. 7 is a side view of the cutter head, with panels removed, illustrating in greater detail the fixed and movable plates and their respective cutter wheels, the spring guides, air valves, and elements of the drive mechanism.
Figure 9:
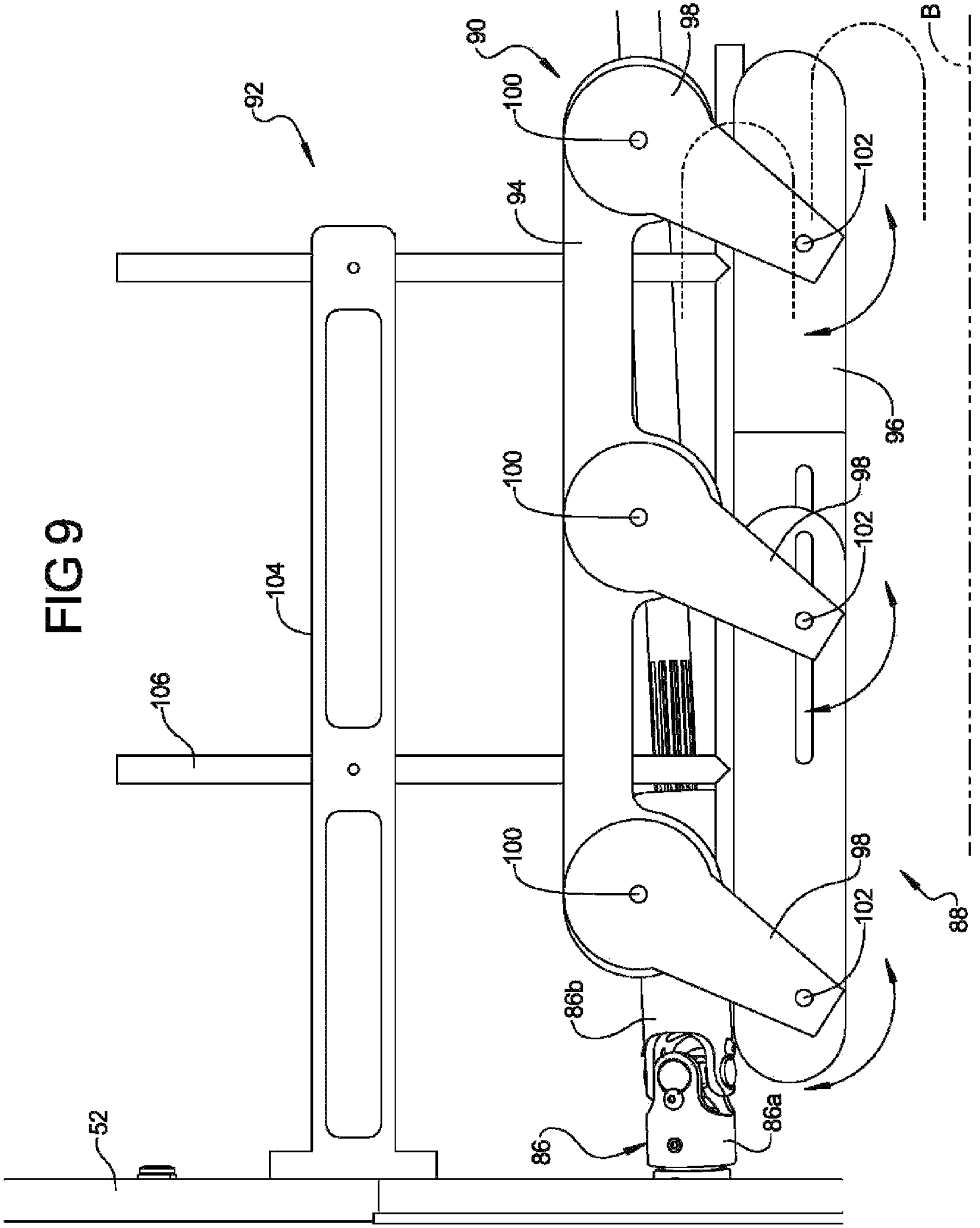
FIG. 9 is an enlarged view of a spring tensioned guide and the driven end portion of a drive shaft.

According to an important aspect of this invention, and referring to FIGS. 5, 7 and 9, there is provided a plurality of spring tensioned guides 88, a first array or set of guides 88 being disposed in the compartment 49, between the plates 48 and 50, and a second array or set of guides 88 being disposed in the compartment 51, between the plates 50 and 52. The spring-tensioned guides 88 are disposed around the openings 56 of the plates and in a manner to center the tube 12 for coaxial movement along the axial path "B."

Referring to FIGS. 5, 7 and 9, the guide linkage 88 comprises a spring assembly 90 and a support or mounting bracket 92. The spring assembly 90 is in the form of a parallelogram linkage and comprises a fixed support beam 94, an elongated engagement beam 96, a plurality of swing arms 98, and a plurality of pins 100 and 102, respectively, that connect one and the other end of the swing arm 98 to the respective beams 94 and 96 in a manner that the engagement beam 96 swings up and down towards and away from the fixed support beam 94 in generally parallel relation thereto and the axis "B." The guide linkage 88 can include means for biasing the engagement beam 96 away from the fixed support beam 94, such as one or more torsion springs (not shown) or any other suitable mechanism which is well known in the art.

The mounting bracket 92 of each the first and second sets of spring tensioned guides 88, respectively, is mounted to the movable plate 50 and the fixed plate 52 in cantilever fashion.

The mounting bracket 92 includes an elongated support arm 104 and a pair of extender rods 106. The mounting bracket 92 has one end secured to a respective of the plates 50 and 52 and the extender rods 106 connect the spring assembly 90 to the mounting bracket 92. The extender rods 106 permit the spring assembly 90 to be positioned in parallel relation proximate to the axial path "B."

As the tubing 12 passes through the cutter head 22 and the openings 56 in the respective plates 46, 48, 50, 52, the bell 18 of the tubing successively engages the lower engagement beams 96, causing the beams 96 to swing upwardly, in a manner that the engagement beams 96 remain generally parallel to the axial path "B." After the bell 18 passes, the torsion springs force the beams 96 downwardly and into guiding engagement with the outer corrugation portion of the tube. The elongated nature of the engagement beams 96 ensures that the tubing remains in centered relation with the path "B."

As shown in FIG. 7, according to a preferred embodiment, an array of tube centering rods 108 are provided on the plates 50 and 52, proximate to the feeder cutter wheels, and in encircling relation to the openings 56 of the plates 50 and 52. The centering rod 108 is in the form of a right angled cantilever beam having one end 110 connected to a respective of the plates 50 and 52 and the other end 112 positioned downstream of the respective opening 56. In the embodiment illustrated, four centering rods 108 are provided on the respective plates 50 and 52 with the ends 112 of each set being on the circumference of an imaginary circle having a diameter slightly greater than the outer diameter of the tube 12. The ends 112 coaxially center the tube with the axial path "B."

The drive mechanism 68 for rotating the drive shafts 66 comprises a plurality of drive wheels 114, a plurality of sprockets 116, and a belt 118. The operation is as described in the aforementioned U.S. Pat. No. 5,381,711 and will not be described in any great detail herein. Generally, the drive wheels 114 are individually mounted upon each drive shaft 66 at the rearward portion 83 thereof. The belt 118 is wound around the drive wheels 114 and the sprockets 116. The sprockets 116 provide tension to keep the belt 118 in tight contact with the drive wheels 114 when in motion. The drive mechanism 68 further comprises a transmission 120 in connection with an electric motor 122. The transmission 120 has a drive train connected to a sprocket or, alternatively, to one of the drive wheels 114. This imparts the necessary energy to allow effective driving operation of the drive shaft 14 and the drive wheels 114.

It is envisioned that the present invention will be capable of accommodating a range of tubing diameters, as desired by the user. Thus, one apparatus may perforate tubing of diameters between 2 inches and 6 inches, while a second machine may perforate tubing over a range of 4 inches to 8 inches in diameter, with various permutations permissible, as desired.

The control system 24 for controlling the operation of the apparatus 10 includes a sonic sensor 124 affixed to the mounting frame 20 and directed at a target 126, affixed to the movable cutter head 22, and a controller (not shown) adapted to receive a signal from the sensor 124, representative of the distance or separation therebetween. Depending on the application and the distance or separation sensed, the sensor 124 will then transmit a signal to the motor 122 to increase or decrease the rotational speed of the drive shafts 66, and thus the rotation of the feeder cutter wheels 64 and the axial advance speed of the tubing.

Additionally, for tubing formed of individual tubing sections joined by a bell 18, the controller serves to actuate the cylinders 70 and retract the rotating feeder cutter wheels 64 from engagement with the advancing bells 18.

In a preferred operation, the tubing 12 is continuously extruded from a machine forming the tubing (not shown), and the tubing 12 is fed into the apparatus 10, via the guide tube 58 associated with the inlet plate 46. The feeder cutter wheels 64 of the cutter assemblies, associated with the adjustable and fixed plates 50 and 52, engage the tube 12. The extruder producing the tubing 12 speeds up, or slows down, whereupon the tubing 12 either pushes the cutter head 22 downstream or upstream along the axis of the tube 12. This then changes the distance from the sensor 124 to the fixed target 126 on the moving cutter head 22. Depending on the distance sensed, a signal is transmitted to the controller to adjust speed accordingly.

If the tubing production slows significantly, a signal to the control system 24 will prevent the perforating apparatus from drawing out newly produced tubing faster than it can be produced, preventing stretching of the pipe and potential snapping thereof.

If tubing is produced at too high a rate, the tubing 12 will push the cutting portion to the forward end of the support frame 26. A signal to the control system 24 will shut down both the extrusion machine and the perforating apparatus 10. Thus, the apparatus will not be pushed too far forward if, for some reason, the tubing 12 is being produced too rapidly. Desirably, the result is a fully self speed adjusting apparatus, requiring no user input.

What is claimed is:

1. An apparatus for perforating a corrugated tube comprising:

at least a first and a second cutter station, each cutter station including at least one pair of feeder-cutter wheels, each feeder-cutter wheel comprising a threaded worm and at least one cutter disposed thereon, each threaded worm being adapted to continuously engage with the corrugations of the tube, the cutter stations being disposed along separate planes such that the first cutter station engages with any given corrugation before the second cutter station, each feeder-cutter wheel operably connected to an associated drive shaft for rotating each feeder-cutter wheel, the drive shafts being oriented at an angle relative to an axial path of the tube;

a drive mechanism for rotating the drive shafts;

a guide linkage for guiding and supporting the tube through the apparatus, the guide linkage having a fixed support beam, an elongated engagement beam for contacting the tube, and a plurality of swing arms, each swing arm rotatably connected to the fixed support beam and the engagement beam at the opposed ends thereof, the guide linkage including means for biasing the engagement beam away from the fixed beam, whereby the guide linkage accommodates tubes of oblong and inconsistent diameters; and wherein at least one of the cutter stations is a movable cutter station being mounted to the apparatus for translatable movement along a path parallel to the axis of the tube, and the drive shafts are extendable to accommodate for the translatable movement thereof.

2. The apparatus of claim 1 including a frame for supporting the cutter stations, the cutter stations being slidably secured to the frame for relative translational movement therewith, the translational movement being along a path parallel to the axis of the tube.

3. The apparatus of claim 2 including a control system comprising a sensor for producing a signal indicative of the velocity of the tube entering the apparatus, whereby the control system is operably connected to the drive mechanism to adjust the rate of rotation of the feeder-cutter wheels based upon the signal produced by the sensor.

4. The apparatus of claim 3 wherein at least one of the cutter stations includes means for radially adjusting the feeder-cutter wheel with respect to the axial path of the tube.

5. The apparatus of claim 1 wherein at least one of the cutter stations includes means for radially adjusting the feeder-cutter wheel with respect to the axial path of the tube.

6. The apparatus of claim 1 including a control system comprising a sensor for producing a signal indicative of the velocity of the tube entering the apparatus, whereby the control system is operably connected to the drive mechanism to adjust the rate of rotation of the feeder-cutter wheels based upon the signal produced by the sensor.

7. The apparatus of claim 6 wherein at least one of the cutter stations includes means for radially adjusting the feeder-cutter wheel with respect to the axial path of the tube.

* * * * *